United States Patent [19]

Bruzzone et al.

[11] Patent Number: 4,714,747
[45] Date of Patent: Dec. 22, 1987

[54] MANUFACTURE OF BUTYL RUBBER

[75] Inventors: Mario Bruzzone; Silvano Gordini, both of San Donato Milanese; Ken Wyllie, Milan, all of Italy

[73] Assignee: Enichem Elastomeri S.p.A., Italy

[21] Appl. No.: 874,851

[22] Filed: Jun. 16, 1986

[30] Foreign Application Priority Data

Jun. 17, 1985 [GB] United Kingdom ............... 8515254

[51] Int. Cl.$^4$ ..................... C08F 2/14; C08F 236/04
[52] U.S. Cl. ........................................ 526/64; 526/88; 526/185; 526/339; 422/137
[58] Field of Search ................ 422/137; 526/65, 88, 526/339, 185, 64; 264/209.6

[56] References Cited

U.S. PATENT DOCUMENTS

| 2,494,588 | 1/1950 | Skooglund | 422/138 X |
| 3,522,214 | 7/1970 | Crawford et al. | 422/137 X |
| 3,536,680 | 10/1970 | Illing | 422/137 X |

FOREIGN PATENT DOCUMENTS

| 0127236 | 12/1984 | European Pat. Off. | 422/137 |
| 0561324 | 5/1944 | United Kingdom | 422/137 |

Primary Examiner—Joseph L. Schofer
Assistant Examiner—F. M. Teskin
Attorney, Agent, or Firm—Cushman, Darby & Cushman

[57] ABSTRACT

The invention relates to a continuous process for the manufacture of butyl rubber in which the monomers are polymerized using a halogenated polymerization medium in a self-cleaning screw extruder at a constant pressure under boiling plug-flow conditions by means of a modified aluminium halide catalyst which operates at high temperature (relative to prior art very low temperatures of e.g. $-100°$ C.). In contrast to prior art slurry processes, the polymerization mixture forms a sticky, highly viscous mass which is conveyed by screw action to the extruder outlet as polymerization proceeds. The butyl rubber product is separated at a high concentration from vapors of unreacted monomers and polymerization medium which are recycled. Cooling is effected by vaporization of a portion of the mixture of monomers and polymerization medium in a flash tank before supply to the extruder and returning the vaporized fraction and recycle vapors to the flash tank through, in succession, a compressor, heat exchanger and throttle valve.

By using the process of the invention, the total energy consumption in butyl rubber manufacture can be cut to about 20% of that of prior art processes.

9 Claims, 1 Drawing Figure

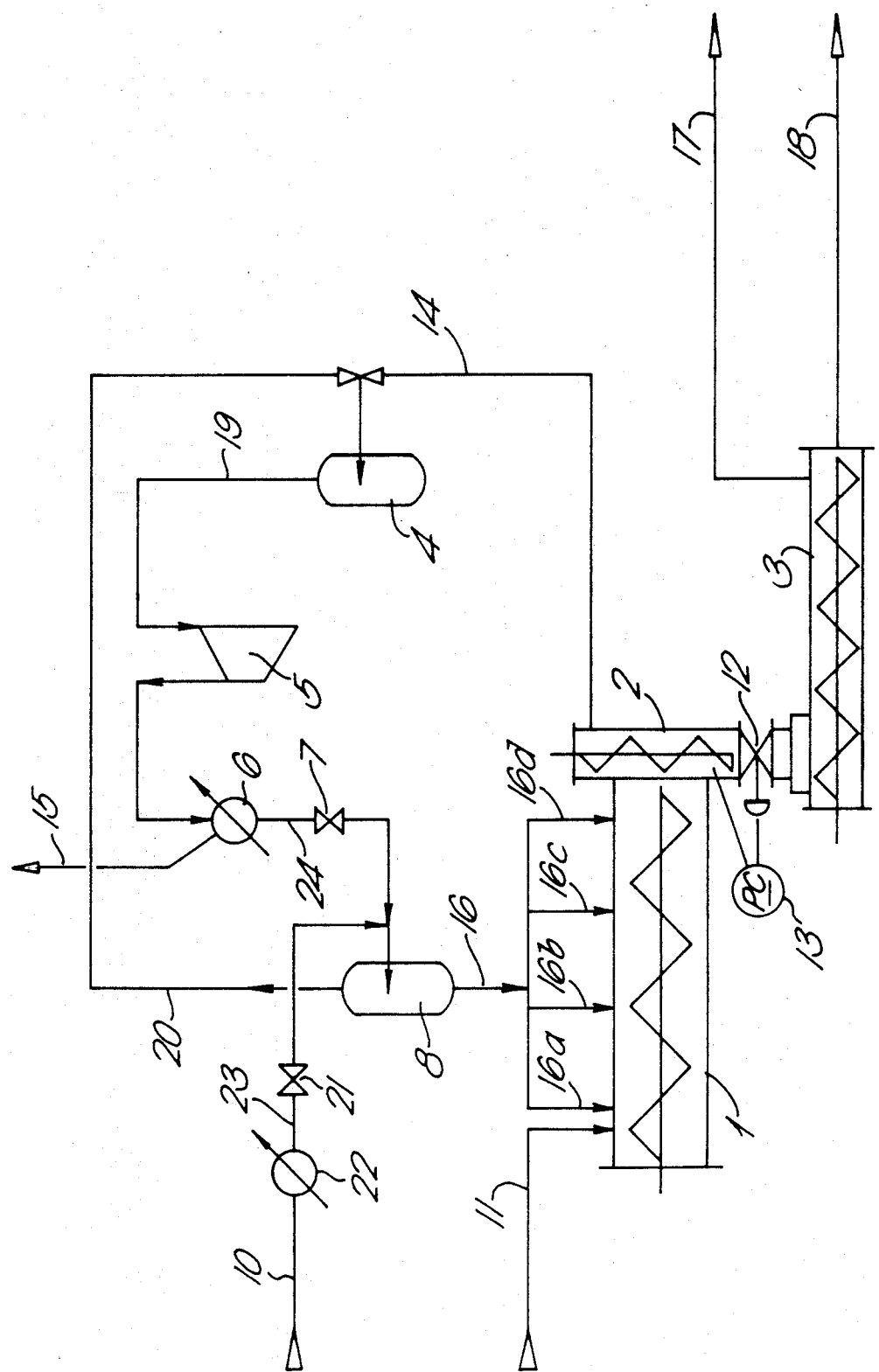

MANUFACTURE OF BUTYL RUBBER

This invention relates to the manufacture of butyl rubber. The expression "butyl rubber" is used in this specification in a wide sense to mean a copolymer of at least 90% by weight of isobutene, with a small amount of one or more conjugated diene comonomers, with optionally minor amounts of one or more comonomers. Typically, the conjugated diene is isoprene but the invention is not limited to copolymers of isobutene and isoprene alone. In particular, the invention relates to a continuous process for the manufacture of butyl rubber.

Butyl rubber has been known for almost fifty years. Usually the rubber is produced commercially by a semi-batch copolymerisation of isobutene and conjugated diene comonomer carried out as a slurry process using methylene chloride reaction medium and a Lewis acid catalyst, typically aluminium trichloride. The reaction is carried out at extremely low temperatures (about $-100°$ C.) in order to obtain high molecular weight polymers. Details of some prior art processes to produce butyl rubber are given, for example, in Encyclopaedia of Chemical Technology (Kirk, R. E. and Othmer, D. F.) 3rd edn. John Wiley & Sons, New York (1978)—volume 8 pages 470–484 (hereinafter "Kirk-Othmer"). Some prior art continuous processes for the manufacture of butyl rubber are discussed in "Vinyl and Related Polymers" Schildknecht, C. E., John Wiley & Sons, New York (1952) pages 576–580 (hereinafter called "Schildknecht").

A major problem with the commercial manufacture of butyl rubber by prior art processes is the high capital and operating cost (mainly energy cost) of the refrigeration plant required to maintain the very low temperatures of polymerisation. For example, the cost of the refrigeration plant may represent about 35% of the capital cost and 75% of the energy cost of the entire plant.

In recent years, catalysts have become available which enable the polymerisation reaction to be carried out at higher temperatures (e.g. $-45°$ C.). Such catalysts are known as "high" temperature catalysts and are described, for example, in "Copolymerisation of Isobutene and Isoprene at "High" Temperatures with Syncatalyst Systems Based on Aluminium Organic Compounds", Cesca, S., Bruzzone, M., Prioa, A., Ferraris, G. and Giusti, P., Rubb. Chem. Tech. 49 937(1976) and U.S. Pat. Nos. 4,154,916, 4,171,414, 4,146,692, 4,103,079 and 4,151,113 (Exxon Research & Engineering). The development of these "high" temperature catalysts has gone some way to alleviating the problem and expense of refrigeration but the temperatures involved are still well below ambient temperature. An associated problem, which exacerbates the problem of refrigeration, is that in prior art processes polymer concentration at the reactor outlet is relatively low, e.g. 20–30% by weight. This necessitates the removal, recycling and cooling of large quantities of reaction medium.

Another major problem in the commercial manufacture of butyl rubber, which increases the difficulty and cost of production, is fouling of the reactor. Polymer builds up on the surfaces of the reactor and of equipment such as agitators, baffles and temperature probes inside the reactor. This build up of polymer also hinders heat transfer to the reactor coolant tubes and jacket. Frequent cleaning is necessary and there is consequent lost production (down) time. In commercial practice, it is usual to have two or three reactor lines so that whilst one line is in use for polymerisation, the others are cleaned and made ready for production (see "Kirk-Othmer" page 475). This greatly increases the capital cost of the plant.

In prior art processes for the manufacture of butyl rubber, the reactors used are stirred cylindrical tank reactors having jackets and tubes for circulation of liquid coolant, such as liquid ethylene. See, for example "Kirk-Othmer" page 474, and U.S. Pat. Nos. 4,146,692 and 4,096,320. Quite complicated reactor designs have been evolved to reduce the problems of cooling and reactor fouling. For example, European Patent Application No. 0,053,585 (Chemical Abstracts No. 97-P111113) describes a cylindrical reactor for the polymerisation of hydrocarbons in solution or suspension, which has an internal rotating cooling unit and scrapers to keep the reactor surfaces clean. One particular use for this reactor is in the manufacture of butyl rubber. This and other cylindrical reactors are also described in a recent paper (ICP 1984, 12 (10) 157-60-C.A. ref 104 89162r).

We have now found that a quite different apparatus can be used for the manufacture of butyl rubber provided that the apparatus is combined in a particular process arrangement and operated under specific process conditions.

According to the present invention a continuous process for the manufacture of butyl rubber by the polymerisation of a monomer mixture comprising essentially at least 90% by weight of isobutene and 0.5 to 10%. by weight (based on the weight of mixture) of at least one conjugated diene comonomer by continuously supplying a feed stream of the monomer mixture and polymerisation medium together with catalyst to an extruder type reactor and polymerising therein, is characterised by the steps of (a) cooling the feed stream of monomers and halogenated hydrocarbon polymerisation medium to a polymerisation temperature of $-70°$ C. to $15°$ C. by vapourisation of a portion thereof under reduced pressure; (b) supplying the cooled feed stream to a reactor which is a self-cleaning screw extruder and polymerising therein under boiling plug-flow conditions at a constant pressure of 0.1 to 4 Bar using a "high" temperature aluminium halide catalyst and (c) removing at the reactor outlet polymer product at a concentration of at least 50% for recovery and a vapourised mixture of unreacted monomers and polymerisation medium, for recycle.

Each one of the steps (a), (b) and (c) above is critical for the successful manufacture of butyl rubber by the continuous process of the present invention. A most important advantage is that by using the process of the present invention the total energy consumption in the manufacture of butyl rubber can be reduced to about 20% of that of prior art processes which use stirred tank type reactors.

Self-cleaning screw extruders have been known for some years. They are useful for processing pasty, highly viscous materials where a mixing and kneading effect is required. Apart from mixing and kneading operations, typical applications described in the commercial literature include heating and cooling, melting, crystallization, sublimation, concentration and drying of viscous materials, solutions and melts and reactions with pasty-viscous intermediate phases. In the early 1970s, the use of self-cleaning two-shaft extruders was described for the continuous solvent-free production of block copolymers from 1,3 diolefins and vinyl aromatic compounds at 50° to 150° C. and the continuous homopolymerisation or copolymerisation of a 1,3 diene or a mixture of 1,3 diene and at least one other polymerisable monomer, in the absence of polymerisation solvent at −20° C. to +150° C., generally at a screw polymerisation temperature of 10° or 20° C. (inlet) and 75° C. or 80° C. (outlet). See British Patent Nos. 1,218,147 and 1,347,088. Their use has also been described in the preparation of diene polymers using rare earth type catalysts in the absence or substantial absence of solvent or diluent at 50°–60° (inlet) and 80°–100° C. (outlet). See European Patent Application No. 0,127,236. As can be seen, the polymerisation temperatures in such processes is above ambient temperatures so that the problem of reactor cooling is minor, compared with the problem of operation at extremely low temperatures. Self-cleaning screw extruders have not been hitherto used or described for the manufacture of butyl rubber, because of the problem of maintaining the extremely low polymerisation temperatures (e.g. −100° C.) required since there is substantially no heat transfer through the extruder walls.

Butyl rubber and processes for its manufacture were extensively studied in the early years e.g. 1940-1945, and many attempts were made to devise improved manufacturing processes. In this context see, for example, "Schildknecht" pages 576 to 582 and the several patents referred to therein. In U.S. Pat. No. 2,494,588 (1944), which is not referred to by Schildknecht and which seems to have been largely ignored in the literature generally, there is a proposal for the production of solid polymers of isobutylene using an extruder-reactor of specific design. The apparatus described therein has a large diameter first portion and a small diameter second portion and a single extruder screw within the bore. The process described appears never to have been put into commercial operation and it does not appear to have been used as a basis for further research.

In contrast to the process described in U.S. Pat. No. 2,494,588, the process of our invention has the following critical characteristics:

1. The process carried out in a self-cleaning screw extruder under plug flow conditions. This is essential because at the polymerisation temperatures used, the butyl rubber swells in the reaction medium so that the reaction mixture is a sticky sludge as opposed to a polymer slurry of prior art processes. If some other type of continuous reactor is used, the residence time cannot be adequately controlled, side reactions occur leading to gel formation and poor quality product.

2. The catalyst used is a "high" temperature aluminium halide catalyst and the polymerisation temperature is −70° C. to +15° C., preferably −50° C. or above. By operating under boiling conditions and cooling the feed stream by vapourisation of a portion thereof under reduced pressure (step a), it is not possible to attain the extremely low polymerisation temperatures (e.g. −100° C.) of prior art processes.

3. The reaction mixture is cooled to the polymerisation temperature by vapourisation of a portion thereof under reduced pressure (step a) and maintained at the polymerisation temperature by polymerising under boiling plug flow conditions at a constant pressure of 0.1 to 4 Bar. No separate refrigerant, such as ethylene, is passed through the reactor and boiled off. As mentioned above, in screw type extruders there is substantially no heat transfer through the reactor walls so that the process arrangement described is critical to the attainment of the polymerisation temperature specified.

4. The polymer recovered at the reactor outlet is at a concentration of at least 50% by weight.

Another early prior art process is disclosed in U.K. Pat. No. 561,324 which relates particularly to means for separating the formed polymer from the recycle stream in which the polymerisation product, as it is formed, is immediately subjected to a kneading process combined with a movement whereby it is conveyed to an extruder, such operations being effected in a series of vessels closed to the exterior whereby the product of polymerisation is kneaded and extruded without any substantial loss of the diluent/refrigerant or reactant materials. One alternative embodiment of the device of the invention described in U.K. Pat. No. 561,324 bears some superficial resemblance to the apparatus used in the process of the present invention. However the apparatus disclosed is not a self-cleaning screw extruder, essential in the present invention, the cooling arrangements are quite different in that liquid ethylene is passed through the apparatus, the reaction temperature is the conventional extremely low temperature, preferably −40° C. to −80° C. and the catalyst described is boron trifluoride.

The self-cleaning screw extruder used in the process of the present invention may be a twin-screw extruder or may be a specially designed apparatus, each capable of carrying a material of progressively increasing viscosity from inlet to outlet in a plug-flow type movement. Twin-screw extruders have two screws which intermesh with each other and consequently are almost completely self-cleaning. However one disadvantage of twin screw extruders is that the free volume of commercially available models is low, generally of only a few hundred litres, which is very small when compared with the commercial requirements of polymer production. Examples of twin-screw extruders are those available from such manufacturers as Werner and Pfleider of West Germany and Baker and Perkins of U.S.A. Screw-type self-cleaning extruders which are specially designed to handle viscous materials are available. Commercially available examples are the AP-CONTI and DISCOTHERM B type machines supplied by Dipl Inj. H. List of Switzerland. The former has two shafts running in a shaped casing. The main shaft with radially mounted, heatable plates joined by kneading bars is purged by the cleaning shaft and its kneading frames, which rotates faster than the main shaft (usually at four times the speed of the main shaft). The free volume of the biggest commercial machine is 2.6 m$^3$. The latter type of self-cleaning extruder (i.e. DISCOTHERM B) has only one shaft which carries disc-like heatable elements with peripheral mixing bars, set at an angle, rotating in a cylindrical housing. The free volume of the biggest commercial machine of this type is 10 m$^3$. Further details of these two types of specially designed apparatus are given in the literature available from the manufacturers.

Reaction is carried out in halogenated hydrocarbon medium which may be a diluent or solvent for some or all of the reaction ingredients (but not the formed polymer). As is well known in the manufacture of butyl rubber, a preferred polymerisation medium is a halogenated aliphatic hydrocarbon, more particularly a halo alkane containing one or two carbon atoms per molecule. Methyl chloride is the one most usually employed. Other examples of halogenated hydrocarbons that may be used in the process of the invention are ethyl chloride and methylene chloride. In a preferred embodiment of our invention, the polymerisation medium comprises a mixture of a halogenated hydrocarbon and a non-halogenated hydrocarbon, the proportion of the latter being up to 50% of the total by volume, preferably 5 to 30% by volume, more preferably 5% to 20% by volume. Under such conditions the polymer formed in the polymerisation together with unreactd monomer and polymerisation medium (hereinafter called "solid phase") performs as a viscous swollen mass (i.e. it is not a free flowing slurry like sand, as in prior art processes). If the proportion of non-halogenated hydrocarbon is below about 5%, the solid phase in the reactor is not swollen enough with polymerisation medium and the particles of polymer remain discrete, i.e. as very small particles. At higher levels (e.g. up to 20%) the polymer particles become sticky enough to stick together forming a cohesive viscous mass. Furthermore, at these levels, the liquid phase (i.e. the monomer/polymerisation medium mixture in excess of that swelling the solid phase) does not dissolve excessive quantities of polymer, the viscosity is kept low and foam problems do not arise during a sudden boil off. Using the halogenated hydrocarbon nonhalogenated hydrocarbon mixture in this way enables the polymer concentration in the solid phase, and thus in the reactor output to be about 50–65% by weight (e.g. 60%), compared with a concentration of 10 to 20% weight in a free flowing slurry as discharged at a very low temperature from the reactor in conventional processes.

The monomer mix which is polymerised in the process of the invention comprises essentially isobutene and at least one conjugated diene. The conjugated diene(s) employed may have from 4 to 14 carbon atoms (e.g. 4 to 8 carbon atoms). Examples of such dienes are isoprene, 1,3 butadiene and 2,3-dimethyl-1,3-butadiene, piperylene, cyclopentadiene, methyl cyclopentadiene and cyclohexadiene. Isoprene is preferred. The proportion of conjugated diene used is generally in the range of 0.5% to 10% by weight, preferably 0.5 to 5% by weight, e.g. 1 to 3%. Optionally other comonomer(s) may be included, if desired. The concentration of monomer in the polymerisation medium supplied to the reactor is high, e.g. 60% to 70% by weight, to keep the formed polymer concentration in the extruder at a high level.

The catalyst used may be an aluminium halide dissolved in halogenated hydrocarbon, such as methyl chloride, but is preferably one of the "high" temperature catalysts which have been developed, such as those referred to above in this specification, dissolved in solvent. The catalyst may be an aluminium alkyl halide which has been reacted with a halogen or mixed halogen as described in British Pat. No. 1,362,295 or an aluminium alkyl, alkyl halide, alkoxy aluminium halide or a selected Lewis acid which has been reacted with one or more of a wide variety of other halogen containing compounds, such as described in British Pat. Nos. 1,407,414 to 1,407,420 or an improved catalyst composition which is a hydrocarbon soluble catalyst formed by prereacting an alkyl aluminium halide with halogen, hydrogen halide or mixed halogen in critical mole ratios (such as described in U.S. Pat. No. 4,171,414) or a halogenated organo aluminium catalyst composition in which the mole ratio of halogen to alkyl aluminium halide is 0.3 to 0.8 (such as described in British Pat. No. 1,542,319). In principle however there appears to be no criticality upon the type of "high" temperature catalyst employed or the amount of catalyst used.

The polymerisation is carried out at a constant pressure (i.e. is an isobaric polymerisation), the pressure corresponding to a boiling temperature of the mixture of monomer/polymerisation medium which is in the range $-70°$ C. to $+15°$ C. and preferably above $-50°$ C. In a preferred embodiment of the invention, the monomers and polymerisation medium are continuously supplied to the extruder via a flash drum maintained at reduced pressure so that a fraction of said monomers and polymerisation medium mixture is vapourised, cooling the remaining contents of the flash drum to the polymerisation temperature (which might be, for example, $-45°$ C.). Furthermore by arranging a compressor, a heat exchanger and throttle valve in the return line from the extruder, vapourised monomer-polymerisation medium mixture removed from the extruder under boiling conditions can be returned via the flash drum to the reactor as a liquid at the same temperature as the vapourised liquid (e.g. $-45°$ C.) thus extracting from the extruder the latent heat of vapourisation for each unit weight of mixture recycled. This arrangement reduces the amount of fluid refrigerant employed compared with prior art polymerisation processes and thus enables significant reductions to be made in energy consumption.

Polymer formed in the polymerisation is conveyed through the extruder as a viscous mass by the extruder screw(s) to the outlet where the polymer is separated from residual monomers and polymerisation medium in separating means. Preferably the separating means comprises a vertically mounted discharge screw (mechanical filter) above a twin screw desolventizer so that the formed polymer can be squeezed free of liquid monomer-polymerisation medium mixture. Gaseous monomer/polymerisation medium mixture vents to a recycle line for recycle after compression, heat exchange and passage through a throttle valve to the flash drum used to supply the extruder.

Residual monomer-polymerisation medium removed in the desolventizer is recovered and recycled, leaving polymer product ready for finishing, e.g. baling and wrapping.

One embodiment of the continuous polymerisation process of the present invention will now be described with reference to the drawing which is a schematic flow diagram showing, in simplified form, the main features of the process.

Referring to the drawing, the extruder 1. is a self-cleaning screw-type extruder such as one of those described in this specification. The outlet is fitted with a twin discharge screw 2 mounted vertically across the outlet and connecting via valve 12 to a twin screw desolventiser 3. A mixture of fresh monomers and polymerisation medium (hereinafter called solvent) is supplied via line 10, heat exchanger 22, line 23 and throttle valve 21 to flash drum 8 together with recycled monomers and solvent supplied via line 24. In flash drum 8, a lowering of pressure occurs which involves vapourisation of a fraction of the mixture of monomers and solvent. This brings down the temperature of the liquid to the polymerisation temperature. The cooled stream of monomers and solvent are supplied to extruder 1, via line 16, the stream being split and supplied at points along the extruder 1, via lines 16a, 16b, 16c and 16d to ensure thorough distribution. Catalyst solution is supplied at the head of the extruder screw via line 11.

As catalyst enters the extruder, it forms polymer which is insoluble in the monomer-solvent mixture and which entraps catalyst. The formed polymer becomes swollen with a certain amount of monomer-solvent mixture according to the equilibrium concentration at the polymerisation temperature. Thus separate phases are formed consisting of (a) a so-called solid phase, comprising polymer containing entrapped catalyst and equilibrium monomer-solvent mixture, (b) a so-called liquid phase comprising monomer-solvent mixture and traces of dissolved polymer and (c) a vapour phase.

As the "solid phase" is conveyed towards the outlet by the screw action of the extruder shaft, the catalyst entrapped in the solid phase forms more polymer, consuming the monomers swelling said phase. The monomers consumed are continuously replaced by fresh monomers, coming from the liquid phase across the solid phase-liquid phase interface, which is being continuously renewed by the screw action. At the extruder outlet section, solid phase is forced into the twin discharge screw 2. In discharge screw 2, the solid phase is squeezed by the screws so that any entrapped liquid phase fraction exceeding the equilibrium concentration is separated and overflows back towards the extruder 1, whereas the gaseous monomer-solvent mixture vents though the vapour outlet line 14, for recycle. Any solid phase fraction entrained by the vapours at this part of the discharge screw is disengaged along the screw and pushed back towards the desolventiser. Under the screw action of discharge screw 2, the solid phase is forced through valve 12, the opening of which is controlled by pressure control, 13. The solid phase enters heated twin screw desolventiser, 3, to which catalyst deactivator and antioxidant are supplied via supply lines (not shown). In the heated desolventiser 3, liquid within and swelling the polymer is vapourised and supplied via line 17 to a conventional recovery section (not shown). The polymer, substantially free of solvent, is supplied via line 18 to a finishing section for baling and packaging.

As mentioned above, the extruder contains a vapour phase since the process of the invention is carried out under boiling conditions, albeit at temperatures between −70° C. to +15° C., usually above −50° C. and therefore usually at below atmospheric pressure. For example, at −45° C. the reactor is kept at the equilibrium pressure of about 0.3 bar absolute. Reaction heat is therefore removed as latent heat of evaporation of the liquid phase. Vapourised liquid phase leaving the extruder via line 14, passes via knock-out drum 4 and line 19 to compressor 5. In the compressor 5, the vapours are compressed and then are cooled by cooling water or, preferably refrigerant, condensed in heat exchanger 6 for return to the flash drum 8, via line 24 and throttle valve 7 through which the pressure decreases to that of the extruder. In flash drum 8, a portion of the feed vapourises and passes to compressor 5, via line 20, drum 4 and line 19 and liquid feed in drum 8 cools to the temperature of extruder 1, before supply via line 16. Any non condensables in heat exchanger 6 are removed via an outlet situated at the coldest section of the heat exchanger towards a vacuum pump (not shown) via line 15.

By the above described arrangement of compressor, heat exchanger and throttle valve and associated equipment all the boiled-off monomer-solvent mixture vapour from the extruder is recycled to the extruder as a liquid at the same temperature as said vapour thus extracting from the extruder the latent heat of vapourisation for each unit weight of mixture recycled.

The pressure into the extruder is kept constant by controlling through conventional means, the flow rate of the vapours to compressor 5. At constant pressure, the temperature of the boiling liquid is constant, once a steady state of liquid composition is reached.

The temperature of the solid phase of reaction mixture in reactor 1 would tend to increase because of the heat of polymerisation developed therein. However this tendency is countered by the intimate contact between solid and liquid phases in reactor 1 enabling polymerisation heat to be transferred to the liquid phase and thence to the ambient through condenser 6. It will be appreciated that this arrangement reduces the need to use a fluid refrigerant at a temperature below that of the polymerisation enabling significant energy consumption economies to be made.

As emphasised above, each one of the steps (a), (b) and (c) of the continuous process of the present invention is indispensable for the successful manufacture of butyl rubber. Firstly, if any one of steps (a), (b) or (c) is omitted, it is not possible to obtain adequate temperature control in the self-cleaning screw extruder so as to maintain a polymerisation temperature of −70° C. to +15° C. Secondly, if the screw extruder, used in the process, is replaced by, for example, a cylindrical type reactor, as used in prior art processes, fouling of the reactor becomes a serious problem because of the rheological characteristics of the polymer mass at the polymerisation temperatures used. At these temperatures, the polymer is swollen with reaction medium and becomes a viscous sticky mass, which is very difficult to handle in cylindrical agitated reactors. Thirdly, if the concentration of formed polymer is less than 50% at the reactor outlet, not only is temperature control more difficult, but much higher volumes of liquid have to be circulated. This negates one object of the invention which is to keep the energy consumption of the process as low as possible. By achieving the high concentration stated, an energy saving of about 50% over conventional processes may be obtained. For this reason, the concentration of monomers in the feed stream is preferably 60% to 70% by weight based on the weight of feed stream. The butyl rubber product has a high molecular weight ($\overline{Mn}$) i.e. at least 50,000, normally 100,000 to 500,000.

EXAMPLE

One particular embodiment of the process of the present invention will now be described by way of example only. In this example, a polymerisation of isobutylene with isoprene was carried out in the apparatus described hereinbefore with reference to the schematic flow diagram shown in the drawing. The amounts of reaction ingredients used, expressed in kilograms per hour at steady state and the temperature in degrees centigrade at the point of measurement indicated, are shown in the table. For convenience, points of measurement referred to are underlined in the following description.

A feed stream comprising a mixture of solvent, (a mixture of halogenated hydrocarbon and non-halogenated hydrocarbon) isoprene and isobutylene, in the relative amounts shown, was continuously supplied to flash drum 8 via line 10, heat exchanger 22, line 23 and throttle valve 21. Flash drum 8 was maintained at reduced pressure so that a proportion of the feed stream vapourised and passed via line 20 to knock-out drum 4 and thence via line 19 to compressor 5. After compression and heat exchange in heat exchanger 6 a stream passed via line 24 and throttle valve 7 is returned to the flash drum 8. The contents of the flash drum 8 at steady state was thus cooled to −45° C., for supply to the screw-type extruder 1. A feed stream was withdrawn from flash drum 8 via line 16 and supplied via a plurality of supply lines 16a, 16b, 16c and 16d to extruder 1. A catalyst stream comprising aluminium diethyl chloride and chlorine as initiator/coinitiator was supplied via line 11. The initiator consumption was 0.3 to 3.0 g per kilogram of finished product (i.e. butyl rubber) and the coinitiator consumption was 0.2 g per kilogram of finished product. Polymer formed in the extruder was conveyed as a solid phase to the outlet by the screw action of the screw shafts and forced into the twin discharge screw 2 and thence to heated screw desolventiser 3. Butyl rubber finished product having a polymerised isoprene content of 3% wt. was recovered via line 18 at the rate of 10 kilogram per hour. Residual monomers and polymerisation medium separated in the discharge screw 2 are recycled via line 14 to knock-out drum 4 (and thence to flash drum 8 by the compressor route described above). Final removal of monomers and polymerisation medium is achieved as a vapour in the twin screw desolventiser 3 already referred to and the vapour removed was recovered via line 17.

TABLE

| Components | Initial feed 23 | Vapourised 20 | Return 24 | Reactor feed 16 | Product 18 | Recycle 14 | Recovery 17 |
|---|---|---|---|---|---|---|---|
| Solvent | 4.9 |  |  |  |  |  | 4.9 |
| Isoprene | 0.3 | 11.8 | 41.8 | 47 |  | 30 | 0.1 |
| i-butylene | 11.8 |  |  |  |  |  | 2 |
| Butyl rubber |  |  |  |  | 10 |  |  |
| Temp. °C. | 0 | −45 | 0 | −45 |  | −45 |  |

Units = kilograms per hour.

What we claim is:

1. A continuous process for the manufacture of butyl rubber by the polymerisation of a monomer mixture comprising essentially at least 90% by weight of isobutene and 0.5 to 10% by weight (based on the weight of mixture) of at least one conjugated diene comonomer by continuously supplying a feed stream of the monomer mixture and halogenated hydrocarbon polymerisation medium together with catalyst to an extruder type reactor and polymerising therein, characterised by the steps of (a) cooling the feed stream of monomers and halogenated hydrocarbon polymerisation medium to a polymerisation temperature of −70° C. to +15° C. by vapourisation of a portion thereof under reduced pressure; (b) supplying the cooled feed stream to a reactor which is a self-cleaning screw extruder and polymerising therein under boiling plug-flow conditions at a constant pressure of 0.1 to 4 Bar using a "high" temperature aluminium halide catalyst and (c) removing, at the reactor outlet, polymer product at a concentration of at least 50% for recovery and a vapourised mixture of unreacted monomers and polymerisation medium, for recycle, whereby no separate refrigerant is required.

2. A process according to claim 1 characterised in that the polymerisation medium comprises a mixture of a halogenated hydrocarbon and 5 to 30% by volume of the total of non-halogenated hydrocarbon.

3. A process according to claim 1 characterised in that the polymerisation temperature is −50° C. to +15° C.

4. A process according to claim 1 characterised in that the high temperature catalyst used is obtained by prereacting an aluminium alkyl, an aluminium alkyl halide or an alkoxy aluminium halide with halogen, hydrogen halide, mixed halogen or a halogen containing compound.

5. A process according to claim 1 characterised in that the concentration of monomers in the feed stream is 60% to 70% by weight based on the weight of feed stream.

6. A process according to claim 1 characterised in that the reactor is a self cleaning twin screw extruder.

7. A process according to claim 1 characterised in that the reactor is a self cleaning screw extruder having a main rotatable shaft with radially mounted, heatable plates joined by kneading bars and a rotatable shaft having kneading frames which interacts with the main shaft.

8. A process according to claim 1 characterised in that the reactor is a self cleaning screw extruder having a single rotatable shaft which carries disc-like heatable elements with peripheral mixing bars set at an angle, the single shaft being disposed in a cylindrical housing.

9. A continuous process according to claim 1 characterised in that monomer mixture and polymerisation medium are continuously supplied to a flash drum which is maintained at reduced pressure wherein a portion of monomer mixture and polymerisation medium is vapourised leaving liquid in the flash drum which is supplied to a self-cleaning screw extruder at a plurality of supply points situated along the screw shaft(s), a high temperature aluminium halide catalyst is supplied at the head of the rotating screw axis whereby to initiate polymerisation of the monomer mixture as it is conveyed by the screw action of the screw shaft(s) and polymer product is recovered at a concentration of at least 50% by weight, the process further being characterised in that the mixture and medium vapourised in the flash drum and unreacted monomers and polymerisation medium recovered as vapour at the extruder outlet are recycled to the flash tank through in succession a compressor, heat exchanger and throttle valve, the pressure into the extruder being kept constant by controlling the flow rate of vapours to the compressor so that the polymerisation is conducted under boiling plug-flow conditions at a constant pressure of 0.1 to 4 Bar.

* * * * *